United States Patent

[11] 3,612,760

[72] Inventor John C. McKechnie
2300 Mohawk Trail, Maitland, Fla. 32751

[21] Appl. No. 766,889
[22] Filed Oct. 11, 1968
[45] Patented Oct. 12, 1971

[54] APPARATUS FOR DETERMINING DISTORTION IN TELEVISION SYSTEMS
1 Claim, 5 Drawing Figs.

[52] U.S. Cl. .......... 178/6.8, 178/DIG. 4, 250/217
[51] Int. Cl. .......... H04n 5/72, H04n 5/21
[50] Field of Search .......... 178/6.8; 315/10, 12; 250/217; 350/276; 178/DIG. 4

[56] References Cited

UNITED STATES PATENTS

| | | | |
|---|---|---|---|
| 2,604,534 | 7/1952 | Graham | 178/6.8 |
| 2,743,379 | 4/1956 | Fernsler | 315/12 |
| 2,851,521 | 9/1958 | Clapp | 250/217 CR |
| 2,892,960 | 6/1959 | Nuttall | 315/10 |
| 2,929,956 | 3/1960 | Jacobs | 250/217 CR |
| 3,358,184 | 12/1967 | Vitt | 178/6.8 |
| 3,378,636 | 4/1968 | Hamilton | 350/276 |
| 1,706,538 | 3/1929 | Mertz | 178/6 TT |

FOREIGN PATENTS

| | | | |
|---|---|---|---|
| 1,119,909 | 12/1961 | Germany | 178/6 TT |

OTHER REFERENCES

Mayers & Chipp– Closed Circuit TV System Planning, 1957–pp. 120– 125

*Primary Examiner*—Robert L. Griffin
*Assistant Examiner*—Joseph A. Orsino, Jr.
*Attorneys*—Joseph C. Warfield, John W. Pease and John F. Miller

ABSTRACT: A scanning pattern or "raster" on the face of a television display tube is examined through a matching ruled grid on a transparent sheet placed over the face of the tube. Distortion in the scanning pattern will produce an observable moire fringe interference pattern which can be used to adjust the television control circuits to correct the distortion. A rectangular dot pattern on a transparency can be used in a like manner to generate patterns indicating horizontal and vertical distortion.

PATENTED OCT 12 1971 3,612,760

SHEET 1 OF 2

John C. McKechnie
INVENTOR.

BY John F. Miller
John M. [signature] Agent
Attorney

John C. McKechnie
INVENTOR.

BY John F. Miller
John W. Pease Agent
Attorney

APPARATUS FOR DETERMINING DISTORTION IN TELEVISION SYSTEMS

The invention described herein may be manufactured and used by or for the Government of the United States of America for governmental purposes without the payment of any royalties thereon or therefor.

BACKGROUND OF THE INVENTION

The invention is in the field of television systems. Television systems of the prior art have not been completely satisfactory because of distortions in the television picture caused by defects in optical and electronic elements resulting in imperfect scanning patterns or "rasters," or mismatching between rasters in camera and display. Applicant solves this problem by providing means for readily identifying the nature and extent of raster distortions whereby the television circuits can be adjusted accordingly.

SUMMARY OF THE INVENTION

The invention comprises an apparatus and method for correcting distortion in a television picture. A ruled grid or dot pattern on a transparent sheet is placed over the face of the display or picture tube and aligned with the television (TV) scanning pattern or raster. The TV display is supplied with a suitable video signal. Any distortion in the TV raster will produce a moire interference fringe pattern on the transparency which can be observed. The TV system can be adjusted to eliminate the interference fringe pattern. Means are also provided for comparing the video signal from camera and/or display with a standard frequency to detect distortion in the TV system.

DESCRIPTION OF THE PREFERRED EMBODIMENT

Present-day commercial television (TV) scan linearity requirements are not overly critical, on the order of 2 to 4 percent. Reasonable linearity alignment to satisfy this requirement can be made by using a Ball Chart or a conventional test pattern. However, present needs for higher resolution in special purpose TV and for commercial TV in the near future require more accurate scan pattern linearity measurements, on the order of one part in 1,000. For example, anticipated systems studies indicate a requirement for scan pattern line densities of 1,500 and greater, resulting in corresponding increases in requirements for linearity.

Increasing the number of TV scan lines will increase the vertical resolution. To insure full use of this increased accuracy, the TV scan pattern linearity should also be increased in proportion to the resolution. Ideally, a method of detecting linearity is desirable when TV scan line densities have been increased beyond perception of the observer. Further desirable features would be a linearity-measuring technique that requires a minimum of accessories for setup time and a quick indication of total distortion.

Figure 1:
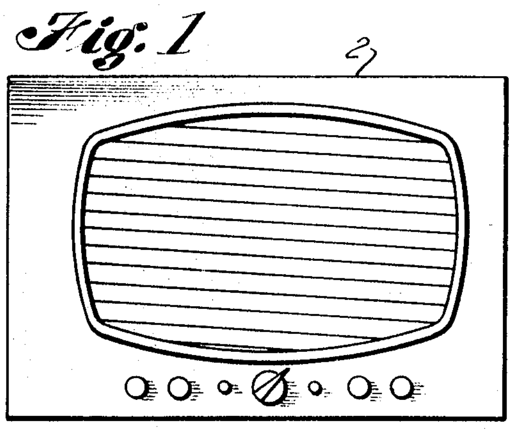
FIG. 1 shows a simplified example of a television scanning pattern.

The TV picture communication channel can be described as a spatial scene transmitted through a camera lens, two synchronized scan patterns (rasters), one at the camera and another at the display. FIG. 1 shows an example of a scanning pattern on the face of a TV display 2. The number of lines shown is small compared with the number in a practical TV system. The spatial scene image is projected onto the phosphor screen of the display cathode-ray tube. Each step in this sequence can distort the image scene in terms of the spatial scene. The human observer must relate the image scene to his estimate of an ideal image scene, to detect distortion. The invention teaches a more exact method.

Figure 2:
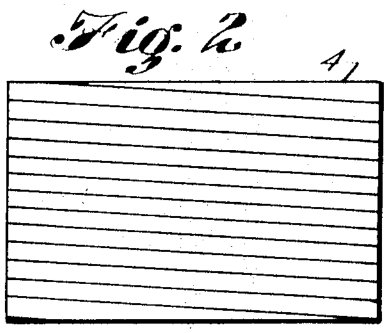
FIG. 2 shows a lined grid ruled on a transparency.
Figure 3:
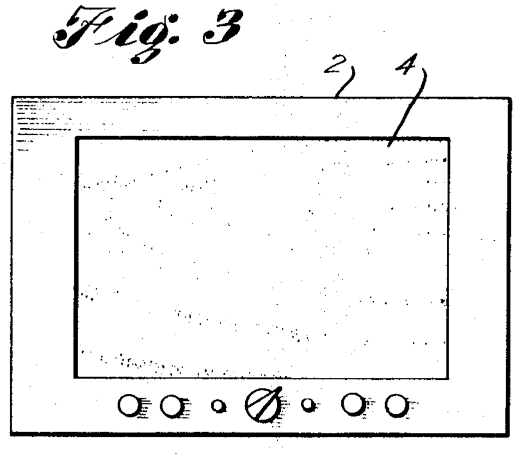
FIG. 3 shows a moire pattern of interference fringes.

A ruled grating transparency 4 is shown in FIG. 2. Transparency 4 has the same number of lines as the TV raster and is placed in front of and against the receiver display. If distortion is present in the TV raster, a line interference pattern or moire pattern will be produced showing differences between the transparency and the scan pattern as shown in FIG. 3. Since the lines on the transparency are straight, any interference fringes produced will be caused by distortions of the scan pattern, i.e., unequal line densities or scan lines not parallel at all points.

Observable scan line distortions are not random but are caused by localized field distortions and nonlinear scan functions. Corrective adjustments can be made for these deficiencies. Random scan line distortions do not repeat at the same points in the image scene and therefore cause only a loss in resolution. The linearity of scan lines determines vertical distortions at the receiver. It is necessary to apply a periodic signal to the receiver video input, synchronized to the horizontal oscillator, to gate the display beam and produce vertical bars. Vertical bars produced at the upper video frequency can be compared with a transparency superimposed on the TV display. Now horizontal distortions can be compared to a regular pattern in the transparency.

Both horizOntal and vertical dimensions of the TV display can be aligned simultaneously. The video channel of the TV display is modulated by the synchronized signal while the display monitor is viewed through a transparency containing a corresponding even array of dots.

The entire TV system can be aligned by using a rectangular dot test pattern. The spacing of the dots is proportional to the resolution limits of the system, i.e., the dots may be spaced apart in both the vertical and horizontal directions a distance equal to the distance between two scan lines. A test pattern having a regular array of dots on either a transparency with a light box or a high-contrast print can be used at the camera end. An exact-scaled transparency replica is placed over the display raster. Fringe interference lines can be seen which map the amount and characteristics of the distortions.

With the method of this invention, scan patterns having considerably greater line densities than commonly used can be examined. Distortion in scan patterns containing several thousand lines per inch can easily be detected.

By means of this invention it is also possible to examine distortion in other kinds of scan patterns, such as spiral or triangular scan. If the spiral or triangular raster is viewed through a transparency containing a flawless pattern, distortion in the raster will cause fringe interference patterns.

The invention can be described mathematically by considering the relation between the two scan patterns, one at the camera and the other at the display. Any element ($e_i$) of the scan pattern can be represented as a function of two variable instantaneous values. For the case of perfectly synchronized scan patterns:

$t_i$ = an instant in time $i_i$ = the instantaneous value of intensity (brightness) for an element ($e_i$) in the spatial scene.

Let $T$ = Transmitter camera end of TV system and $R$ = Receiver display end of TV system.

Now: $(X_i, Y_i) = f(t_i)$

Where: $(x_i, y_i)$ are scan pattern coordinates at instant $(t_i)$

Then: $e_i = f(x_i y_i i_i)$

Ideally: $x_i^T = x_i^R$ $$y_i^T = y_i^R$$

$$i_i^T = i_i^R$$

When distortion $n$ is introduced:

$$x_i^T + m_x^T \quad x_i^R + n_x^R$$

$$y_i^T + n_y^T \quad y_i^R + n_y^R$$

Scan distortions are made up of both fixed nonlinear distortions and uncorrelated time-varying distortions.

$$n = n(x^{TR}, y^{TR}) + n(t)$$

The fixed distortion is in the scan pattern itself and represents a constant distortion of the display picture to the observer. The timeavarying distortion represents movement of the display. Additional fixed distortions may be added by the camera lens system.

$$N = n(x^{TR}, y^{TR}) + n(x^L, y^L) + n(t)$$

The most common TV scan pattern is a series of parallel horizontal lines, equidistantly spaced. These lines are similar in many respects to ruled gratings. When two ruled gratings are superimposed, interference or moire patterns are produced. (Moire patterns are named after a textile fabric which produces an optical phenomena of interference fringe patterns.) Similar characteristic fringe interference lines can be produced using two superimposed ruled gratings by either rotating one with respect to the other or superimposing two patterns with different line densities.

Figure 4:
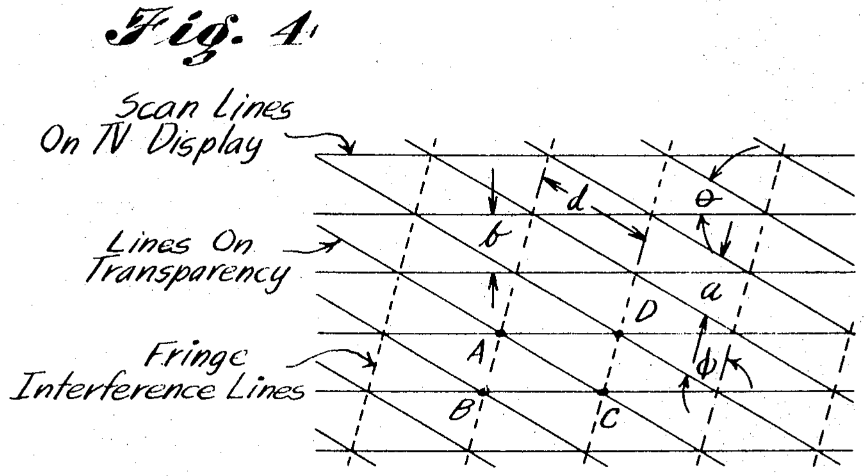
FIG. 4 is a graph of fringe-spacing versus raster-spacing error.

Two superimposed ruled gratings and their associated moire fringe pattern can be represented graphically as shown in FIG. 4.

Let:

$a$ = spacing between elements on the reference transparency $b$ = spacing between elements on the raster display $d$ = spacing between fringe interference lines $\theta$ = included angle between the grid lines of the transparency and the scanning lines of the raster display From the diagram of FIG. 4 two basic equations can be determined.

Using equal areas and the law of cosines:

$$1/d^2 = 1/a^2 + 1/b^2 - 2 \cos \theta / ab \qquad (1)$$

Using the sine relationships and the law of cosines:

$$\sin \phi = \frac{\pm b \sin \phi}{(a^2 + b^2 - 2ab \cos \theta)} \qquad (2)$$

First consider a TV raster having no angular errors ($\theta = 0$) but only errors in the number of horizontal lines per unit vertical dimensions; i.e., $a \neq b$ Equation (1) reduces to:

$$a/b = 1 \pm a/d \qquad (3)$$

Second, if the angle ($\theta$) varies across the screen due to line curvature and the number of horizontal lines per unit vertical dimension is constant, ($a = b$) equation (1), for angular errors reduces to:

$$/\theta/ = \bar{a}/\bar{d} \qquad (4)$$

Equations (3) and (4) show that wide fringe spacings ($d$) are formed from small differences between $a$ and $b$ spacings and for small line angle errors ($\theta$). By this method it is possible to magnify scan line distortions several thousand times. Moreover, the magnitude of distortion is clearly visible over the entire screen area. Considerably greater scan patterns line densities can be examined. Scan patterns containing several thousand lines per inch will display distortion-caused fringe patterns to the naked eye when the scan lines themselves are not perceived.

As an example, consider a CCTV of 1,029 lines per frame, 800 visible horizontal scan lines, and capable of resolving 600 TV lines. Horizontal fringe lines are found to be spaced at 2½inches. Close inspection shows the lines parallel with substantially no angular error. The raster is 8 inches by 10⅝ inches.

From equation (3):

$$a = 8''/800$$

$$a/b = 1 \pm (0.01)/(2.5)$$

$$a = (1.004)\ b \text{ or } (0.996)\ b$$

The TV display is in error by four resolvable elements in 1000 in that area of the screen or 0.4 percent.

Had the linearity been adjusted for minimum fringe lines and still areas of the screen found where fringe spacings were 4 inches apart, equation (4) would apply.

$$/\theta/ = \frac{.01}{4''}$$

=2.5 milliradians angular error or approximately 8.4 minutes.

These figures apply only to the areas of the screen in which they were measured.

Thus, the method and apparatus of the invention offer the following advantages:

1. Time-varying changes in the raster linearity can easily be observed.
2. The entire raster can be observed at once for linearity.
3. Distortions in the raster are magnified by the number of lines per frame.
4. Any camera and receiver scan pattern can be compared to a fixed spatial standard.

Figure 5:
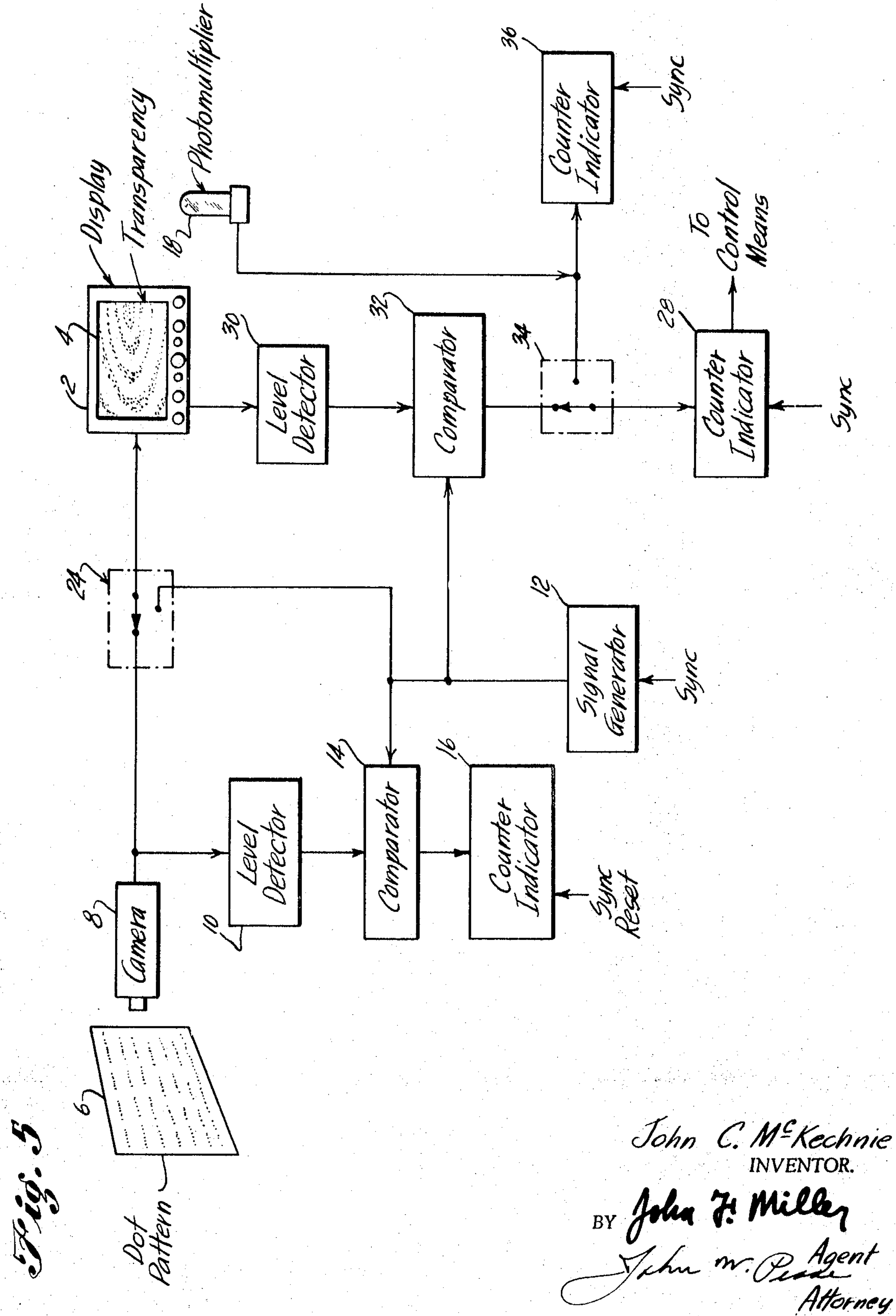
FIG. 5 is one embodiment of the invention.

FIG. 5 shows applicant' s invention in a complete TV system. A rectangular dot pattern 6 is scanned by a camera 8. Dot pattern 6 has dots spaced in the horizontal and vertical directions a distance equal to the limiting resolution of camera 8. That is, the dots are spaced apart a distance no greater than the line spacing of the camera scanning raster. The video output of camera 8 representing the dot pattern is passed through a level detector 10 and compared in comparator 14 with a signal train from a signal generator 12. Signals from 10 which are not coincident with the signals from 12 are passed to a counter indicator 16 where they are stored and displayed. Signal generator 12 may be a frequency stable oscillator or any device capable of generating an accurate pulse train which is an electrical analog of dot pattern 6. Any misalignment of signals from 10 and 12 results from distortion in camera 8. Counterindicator 16 may be a known device which will hold and display a running count accumulated during each frame and changing only when the count per frame changes, being reset by a frame sync signal. Lines labeled "sync" are shown connected to some of the elements in FIG. 5 to indicate that the elements of the invention are synchronized with the frame sync signals of the TV system in a manner well known in the art. Camera 8 may be adjusted by observing the running count in counter-indicator 16 and adjusting for a minimum count.

The video circuitry ahead of the CR tube in TV display 2 may be adjusted by observing the count in a counter-indicator 28 which is derived from a comparison of the video signal from display 2 and level detector 30 with the signal train from signal generator 12 in comparator 32. A switch 24 in the connection between camera 8 and display 2 may be used to connect either signal generator 12 or camera 8 to the input of display 2. Thus if 12 is connected to 2, the count in counter-indicator 28 will represent video circuit intermittences or distortion in display 2 only, but if camera 8 is connected to 2, the count in 28 will represent distortion in both camera 8 and display 2. Thus, distortions in both camera and display, some of which might be counteracting, could be compensated for by adjusting display 2 to minimize the count in 28. A line from counterindicator 28 labeled "to control means" indicates that the system could be made self-adjusting by using the information stored in 28 to operate well-known optimalizing control means to adjust display 2 and/or camera 8 if desired. Means for adjusting the scanning patterns of the display and camera are well known. For example, the adjustments on a display commonly include vertical and horizontal linearity controls, height and width controls, horizontal and vertical centering controls, size controls, etc. Adjustable sweep voltage circuits are taught in, for example, U.S. Pat. Nos. 3,219,874; 3,233,143; and 3,235,767. An infinitely variable sweep voltage control, adjustable to compensate for any sweep voltage nonlinearities, is disclosed in U.S. Pat. No. 3,542,951 to Hanns H. Wolff. Such well-known means for adjusting scanning patterns can be controlled by known automatic control means to make applicant's system operate automatically if desired. Automatic control systems are taught in textbooks such as, for example, the "Handbook of Automation, Computation and Control" by Grabbe, Ramo, and Wooldridge, published by John Wiley & Sons, Inc. Optimizing control systems such as taught in, for example, U.S. Pats. Nos. 3,048,331; 3,070,301; 3,154,670 and others are suitable for use in appdicant's system. Optimizing control systems have the ability to continually adjust system input parameters and compare the current system output with a previous output to seek out the best adjustment of inputs for obtaining a desired output. Usually these control systems are programmed to make adjustments in such sequences and patterns that output trends are quickly detected as a guide for further experimentation.

U.S. Pat. No. 3,044,701 to Westinghouse Electric Corp., East Pittsburgh, Pennsylvania, teaches an optimizing control system which could be "plugged-in" to applicant's system. This Westinghouse control uses a register such as applicant's counter indicator 28 to store the current system output value. This value is continually compared with previous output values stored in other registers. Comparison results control system input-adjusting means which adjust various inputs in various sequences and patterns to seek an optimum output.

A switch can be used to break the connection to comparator 32 and to make a connection between counterindicator 28 and a photomultiplier 18. Photomultiplier 18 is positioned and housed in suitable masking to detect misalignment visible as reoccurring interference fringe patterns in transparency 4 which may have a ruled grid or dot pattern thereon. The pattern will be dimensioned proportional to the limiting resolution of display 2 or the TV system. Photomultiplier 18 responds to the almost instantaneous coincidence of the CR tube-scanning beam with the dots of the pattern to generate a time-varying signal having perturbations representing coincidences which can be counted. Then the count in 28 will represent distortions as represented by the interference fringe pattern on transparency 4. This may include distortions arising in the cathode-ray tube of display 2 as well as distortions arising from the display circuits ahead of the cathode-ray tube.

When desired, the total distortion arising in display 2 can be compared with the distortion caused by circuits ahead of the cathode-ray tube by counting the interference fringe related signals from photomultiplier 18 in an auxiliary counterindicator 36 and comparing the video signal from 2 and the standard from signal generator 12 in the manner explained hereinbefore. Then the counts in 28 and 36 can be compared to identify the elements contributing to the total distortion.

What is claimed is:

1. In a television system, the improvement comprising:

a camera, a display, said camera and said display each generating a respective scanning pattern, means for synchronizing said scanning patterns, means for adjusting said scanning patterns, a stationary pattern fixed on a transparency and adapted to be placed on the face of said display, said pattern being of such configuration and such dimensions that a moire interference fringe pattern is displayed on said transparency when said display-scanning pattern is distorted, whereby said adjusting means may be actuated to remove the distortion from said television system, a dot pattern adapted to be scanned by said camera, said dot pattern having dots spaced apart a distance equal to the spacing of the lines in the scanning pattern of said camera, said camera developing video information to be forwarded to said display, a first level detector connected to receive the video output of said camera, a signal generator, a first comparator, said comparator being connected to receive a signal train from said first level detector and a signal train from said signal generator and to generate an output signal when said signal trains are misaligned, a first counterindicator connected to receive the signal output from said first comparator, whereby the count in said counter is representative of distortion in said camera, a second level detector adapted to receive a video signal from said display, a second comparator connected to compare a signal from said second level detector with a signal from said signal generator and to forward an output signal to a second counterindicator when the signal from said second level detector and said signal generator are misaligned, whereby the scanning raster of said display may be adjusted to minimize distortion by minimizing the count in said second counterindicator and a photomultiplier positioned and housed so as to respond to any interference fringe pattern on said transparency placed on the face of said display, and an auxiliary counterindicator connected to receive the output signal of said photomultiplier.